United States Patent
Geisler et al.

(10) Patent No.: US 12,555,868 B2
(45) Date of Patent: Feb. 17, 2026

(54) PARTICLE SEPARATOR FOR BATTERY PACKS AND BATTERY BACK HAVING A PARTICLE SEPARATOR

(71) Applicant: Mercedes-Benz Group AG, Stuttgart (DE)

(72) Inventors: Tobias Geisler, Kirchheim (DE); Daniel Blauwitz, Uhingen (DE); Sascha Koch, Stuttgart (DE)

(73) Assignee: Mercedes-Benz Group AG, Stuttgart (DE)

(*) Notice: Subject to any disclaimer, the term of this patent is extended or adjusted under 35 U.S.C. 154(b) by 920 days.

(21) Appl. No.: 17/783,213

(22) PCT Filed: Dec. 3, 2020

(86) PCT No.: PCT/EP2020/084549
§ 371 (c)(1),
(2) Date: Jun. 7, 2022

(87) PCT Pub. No.: WO2021/115936
PCT Pub. Date: Jun. 17, 2021

(65) Prior Publication Data
US 2023/0019147 A1    Jan. 19, 2023

(30) Foreign Application Priority Data
Dec. 13, 2019   (DE) ................... 10 2019 008 657.0

(51) Int. Cl.
*H01M 50/358*   (2021.01)
*B60L 50/64*    (2019.01)
(Continued)

(52) U.S. Cl.
CPC .......... *H01M 50/358* (2021.01); *B60L 50/64* (2019.02); *H01M 10/0525* (2013.01);
(Continued)

(58) Field of Classification Search
CPC .. H01M 50/35; H01M 50/357; H01M 50/367; H01M 50/358
See application file for complete search history.

(56) References Cited

U.S. PATENT DOCUMENTS

| 5,690,709 A | * | 11/1997 | Barnes | ...................... B04C 3/04 55/318 |
| 6,120,931 A | | 9/2000 | Fossati et al. | |

(Continued)

FOREIGN PATENT DOCUMENTS

| CN | 105939792 A | 9/2016 |
| DE | 198 30 557 A1 | 1/1999 |

(Continued)

OTHER PUBLICATIONS

PCT/EP2020/084549, International Search Report dated Mar. 4, 2021 (Two (2) pages).

(Continued)

*Primary Examiner* — Jeremiah R Smith
(74) *Attorney, Agent, or Firm* — Crowell & Moring LLP (57) ABSTRACT

A particle separator includes an inlet and an outlet where solid particle are separable from a particle-battery gas mixture introduced with overpressure at the inlet by the particle separator and where the battery gas is depressurizable at the outlet. The particle separator further includes a gas channel wound in a screw shape in an axial direction which fluidically connects the inlet to the outlet. The gas channel has a particle emission on an outlet-side end of the particle separator which is opened in a radial direction and through which the solid particles are passable.

9 Claims, 4 Drawing Sheets

(51) Int. Cl.
*H01M 10/0525* (2010.01)
*H01M 50/30* (2021.01)
*H01M 50/308* (2021.01)
*H01M 50/367* (2021.01)

(52) U.S. Cl.
CPC ....... *H01M 50/308* (2021.01); *H01M 50/367* (2021.01); *H01M 50/394* (2021.01); *H01M 2220/20* (2013.01)

(56) References Cited

U.S. PATENT DOCUMENTS

| | | | |
|---|---|---|---|
| 2011/0138757 A1* | 6/2011 | Chen | B01D 45/14 55/317 |
| 2016/0380248 A1 | 12/2016 | Haer et al. | |
| 2020/0164388 A1 | 5/2020 | Bayrakci | |
| 2021/0359374 A1* | 11/2021 | Reinprecht | H01M 50/358 |
| 2022/0255184 A1* | 8/2022 | Czech | H01M 50/35 |
| 2022/0288641 A1* | 9/2022 | Goodwin | B07B 9/02 |
| 2023/0253672 A1* | 8/2023 | Fronemann | H01M 10/625 95/267 |

FOREIGN PATENT DOCUMENTS

| | | |
|---|---|---|
| DE | 102 57 918 A1 | 6/2003 |
| DE | 10 2013 204 585 A1 | 9/2014 |
| DE | 10 2017 213 608 A1 | 2/2019 |
| WO | WO 2008/111909 A1 | 9/2008 |

OTHER PUBLICATIONS

Chinese-language Chinese Office Action issued in Chinese Application No. 202080085509.4 dated May 23, 2024 (5 pages).

* cited by examiner

PARTICLE SEPARATOR FOR BATTERY PACKS AND BATTERY BACK HAVING A PARTICLE SEPARATOR

BACKGROUND AND SUMMARY OF THE INVENTION

The invention relates to a particle separator for battery packs. Furthermore, the invention relates to a battery housing having such a particle separator, a battery pack comprising such a battery housing having a battery module encapsulated therein, and a motor vehicle comprising such a battery pack.

Document DE 10 2013 204 585 A1 proposes a battery pack, for example for use in electric or hybrid motor vehicles. In the event of degassing in which a single battery cell releases gas from its inside, for example due to overcharging or thermal overload via an overpressure mechanism, a specific clearance is provided in a battery pack housing, into which the released gas can be released and here can reduce its temperature and its pressure. The gas is then released to the outside from inside the battery pack housing through an overpressure discharge device. The gas here flows through a particle separator provided in the overpressure discharge device, for example in the form of a cyclone separator or a surface filter with a fibre-reinforcement or an open-pored spongy structure. Particles contained in the gas, such as graphite dust, for example, can here be filtered out by flowing through the particle separator, in order to reduce the danger of explosion, for example, by glowing particles inside the emerging gas.

The object of the invention is to specify an improved particle separator for battery packs. The object of the invention is further to specify an improved battery housing for battery packs, an improved battery pack and an improved motor vehicle.

A particle separator is set up to separate solid particles from a particle-battery gas mixture, and has an inlet, which is set up with overpressure to introduce the particle-battery gas mixture. The particle separator has an outlet, which is set up to release the battery gas.

According to the invention, the particle separator has a gas channel which is wound in the manner of a screw in an axial direction and which fluidically connects the inlet to the outlet. On the outlet-side end, the particle separator has a particle emission, which is open in a radial direction, i.e., in a direction perpendicular to the axial direction and is set up for the feed through of particles.

Advantageously, due to the separation of the particles from the battery gas, its chance of igniting is reduced. In particular, glowing particles released in the event of a thermal overload of a battery cell, for example graphite or metal particles, are prevented from igniting the battery gas when emerging into the surroundings.

Conventional particle-battery gas separators separate the particle-battery gas mixture by means of acceleration, wherein, due to their greater inertia, the heavier particles are deflected less quickly than the lighter battery gas. Here, the particles sink to the ground somewhere along the acceleration path.

In contrast, the proposed particle separator has the advantage that the particles are led, together with the battery gas, through the screw-shaped gas channel and in addition to the axial linear speed component pointing in the longitudinal direction of the screw-shaped gas channel, an angular speed component, which is directed tangentially to the screw shape of the gas channel and which causes a centrifugal force on the moved particle-battery gas mixture. Under the influence of the centrifugal force, the heavier particles are moved radially outwards, i.e., perpendicularly to the linear speed components and perpendicularly to the angular speed components, and here push the lighter battery gas radially inwards.

The particles emerge at this point through the radial opening of the particle emission and can be collected and received centrally, while the battery gas can flow out and depressurise substantially without deceleration in the axial direction. The current resistance of the proposed particle separator is advantageously reduced in comparison to solutions from the prior art. Thus, particularly efficient pressure relief of a particle-battery gas mixture emitted under overpressure through the particle separator is possible.

In an embodiment of the invention, the gas channel is formed by a screw arranged in a standpipe. The screw has a screw coil which is wound around an axial screw axis, i.e., extended in the longitudinal direction of the standpipe.

The standpipe has a stroke protruding radially inwards in relation to the screw axis and wound in the axial longitudinal direction. The stroke is wound correspondingly to the screw coil.

The standpipe is sealed in a gas-permeable manner on the inlet side by a sieve plate and is widened in the shape of funnel on the outlet side in an outlet trumpet. The particle emission is arranged as a radial slot in the cover of the standpipe in the region of the outlet trumpet.

By means of the screw coil and the correspondingly wound stroke, a screw-shaped gas channel can be formed in a very simple manner. The coil and standpipe can be formed to be able to be disassembled from each other. Thus, a simple and cost-effective production and assembly are possible. In addition, the design of the screw-shaped gas channel by means of a coil has the advantage that a particularly large, clear inner diameter of the standpipe can be available for guiding through the particle-battery gas mixture, such that particularly good pressure relief is made possible via the particle separator.

In one embodiment, the coil wind and the stroke each have approximately three windings on the inside of the standpipe casing. An increase in the number of windings of the screw coil causes an increase in the radial acceleration, and thus also an improved separation of the particles from the battery gas, wherein the degree of improvement, however, gradually decreases by means of an additional winding with increasingly long screw coils. A number of approximately three windings has proved to be an optimum compromise between a good separation effect of the particle separator and the requirements of construction space caused primarily by its axial length.

In one embodiment, the particle emission is extended beyond a full coil height of the screw coil and radially opened. Thus, the particles pushed radially downwards can be forced out as completely as possible and thus a particularly good separation effect of the particle separator can be achieved.

In an embodiment, the sieve plate is set up for holding back particles with a cross-section of at least 1.5 mm. Holding back larger, thus also heavier and more sluggish particles, allows for a shorter design of the particle separator and an improved passage of the particle-battery gas mixture. At the same time, sufficiently large sieve openings allow for a small current resistance and thus efficient overpressure relief by means of the particle separator. Sieve openings with a cross-section of about 1.5 mm have proved to be a good compromise between a good separation effect and a small current resistance.

A battery housing is set up for encapsulating at least one battery module in a gas-tight manner and comprises an insulation insert with at least one aperture arranged therein, which is set up for the fluidic connection of the interior of the battery housing to its surroundings above a predetermined overpressure threshold value in the interior.

A particle separator according to the invention is arranged in the at least one aperture. In the insulating insert, at least one separation chamber is recessed, which is fluidically connected to the particle mission of the at least one particle separator.

After a thermal overload of a battery cell of the at least one battery module, the particle-battery gas mixture formed is led out through the particle separator when the predetermined overpressure threshold value is exceeded. Here, particles that may still be glowing and which could ignite battery gas emerging into the surroundings are led through the particle emission into the lower-current separating chamber. Thus, the probability of igniting the emerging battery gas is significantly reduced.

A battery pack comprises a battery housing according to the invention with the particle separator according to the invention, wherein at least one battery module is encapsulated in the battery housing. By preventing the ignition of battery gas emerging in the event of thermal overload, the operating safety of such battery packs can be improved.

In one embodiment, the at least one battery module comprises at least one lithium-ion battery cell. Lithium-ion battery cells have a high degree of energy density and a long lifetime and, in the case of thermal overload, emit a particle-battery gas mixture whose ignition probability can be effectively reduced with the particle separator according to the invention.

Furthermore, a motor vehicle, preferably an electric vehicle, is proposed which is operated and/or supplied at least partially by such a battery pack. Such a motor vehicle has a particularly high level of operating safety. In particular, an electric vehicle formed in this way satisfies applicable legal, regulatory and/or normative safety regulations in terms of the duration of time between setting a thermal overload and a battery fire starting.

Exemplary embodiments of the invention are explained in more detail below by means of drawings.

DETAILED DESCRIPTION OF THE DRAWINGS

Parts corresponding to one another are provided with the same reference numerals in all figures.

Figure 1:
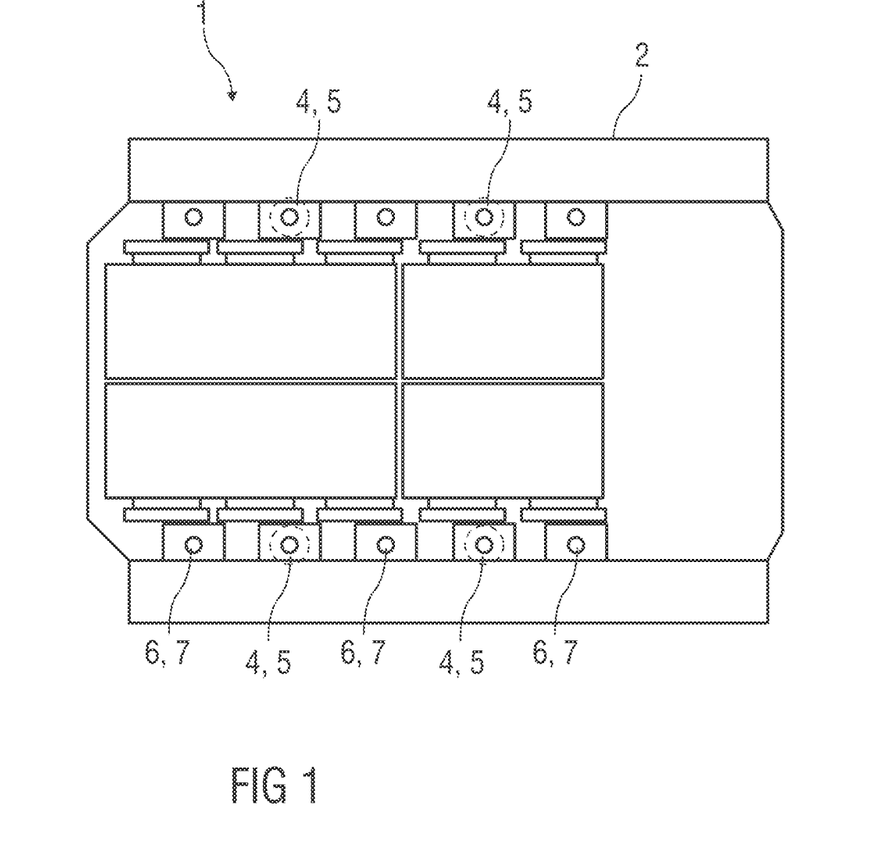
FIG. 1, schematically, is a cross-section through a battery pack.

FIG. 1 shows a schematic cross-section of a battery pack 1 having a battery housing 2. The battery housing 2 is formed to be gas-tight. Battery modules 3 are arranged inside the battery housing 2.

If the battery pack 1 or a battery module 3 is damaged, it is possible that battery gases are formed which must be dissipated into the surroundings in a controlled manner to avoid an explosion of the battery back 1. Leading battery gases out of the battery housing 2 is carried out along insulation inserts 4.

The insulating inserts 4 have apertures 5 explained in more detail below and set up for guiding out the battery gas, between the inside of the battery housing 2 and its surroundings, which are sealed in a gas-tight manner in each case by a bursting disc 6 and/or a bursting valve 7. If an overpressure inside the battery housing 2 reaches a predetermined threshold value, the bursting disc 6 bursts and/or the bursting valve 7 opens. Thus, the relief of the battery gas under overpressure is possible through the insulating insert 4.

Figure 2:
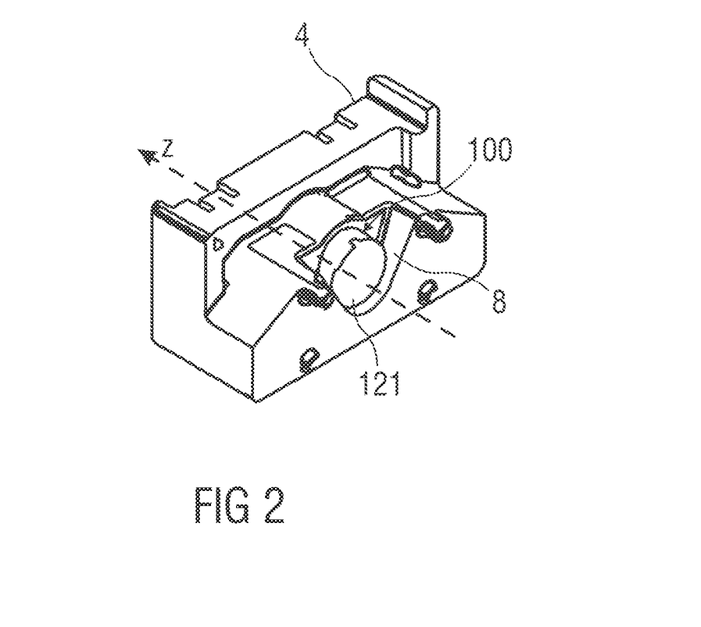
FIG. 2, schematically, is a perspective view on the inlet side of an insulating insert.

FIG. 2 schematically shows a perspective view of an insulating insert 4 from the point of view of the inside of the housing of the battery housing 2. When the bursting disc 6 is burst or the bursting valve 7 is open, battery gases are dissipated though an axial separator 100 by an inlet 8 in an axial direction z into the outer surroundings of the battery housing 2. The axial separator 100 is arranged in the cylindrical aperture 5 by the insulating insert 4. On the side of the inlet, the axial separator 100 is sealed via a sieve plate 121. The arrangement and functionality of the sieve plate 121 is explained in more detail below.

Figure 3:
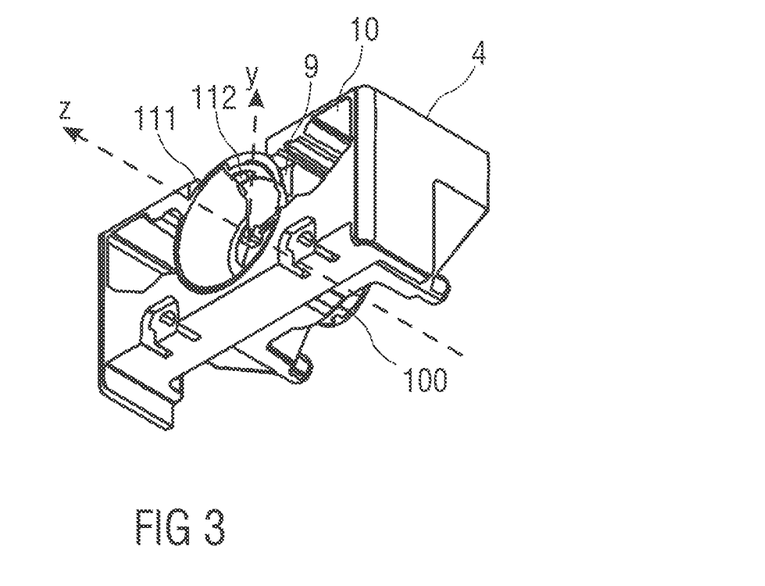
FIG. 3, schematically, is a perspective view on the outlet side of an insulating insert.

FIG. 3 schematically shows a perspective view of the insulating insert 4 from the opposite point of view, i.e., from the surroundings of the battery housing 2. On the outlet side, the axial separator 100 has an outlet trumpet 111 widening in the shape of a trumpet, via which the emerging battery gas is dissipated into the surroundings.

A radial, slot-shaped particle emission 112 is recessed in the outlet trumpet 111. The particle emission 112 is provided for emitting solid particles which are also guided by the emerging battery gas and are small enough to pass through the inlet-side sieve plate 121.

As is explained in more detail below, the particles are led in a radial direction y through the particle emission 112, while the battery gas flows out in the axial direction z. The emitted particles are led into the separation chamber 10 via a particle channel 9, which is formed as a fluidic connection between the particular emission 112 and a separating chamber 10.

Figure 4:
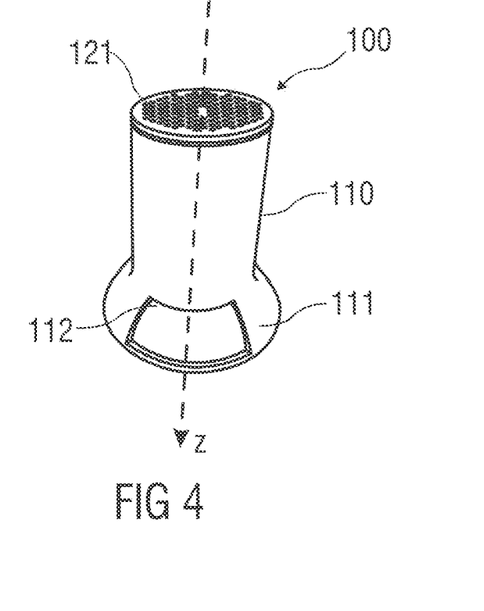
FIG. 4, schematically, is a perspective view of an axial separator.

FIG. 4 shows the axial separator 100 in an outer perspective view. The axial separator 100 is flowed through by battery gas in the axial direction z, which flows in at an inlet-side end of the battery housing 2, the end being attached to the sieve plate 121 and at an outlet-side end attached to the outlet trumpet 111.

A cylindrical, hollow standpipe 110 is arranged between the sieve plate 121 and the outlet trumpet 111, the standpipe receiving a coil 120 that is not visible inside. At the base of the outlet trumpet 111 on the standpipe 110, the particle emission 112 is recessed in the coating of the axial separator 100. The particle emission 112 extends as an elongated slot along the periphery of the axial separator 100 over a length of about a third to a sixth of the total periphery.

The outer periphery of the outlet trumpet 111 is set back over the length of the particle emission 112 and is more curved than the remaining region of the outlet trumpet 111.

The axial separator 100 is preferably produced from a light material that is highly resistant to heat and pressure. Here, phenol formaldehyde resins, such as, for example, Bakelite® PF 1110, are inter alia considered.

Figure 5:
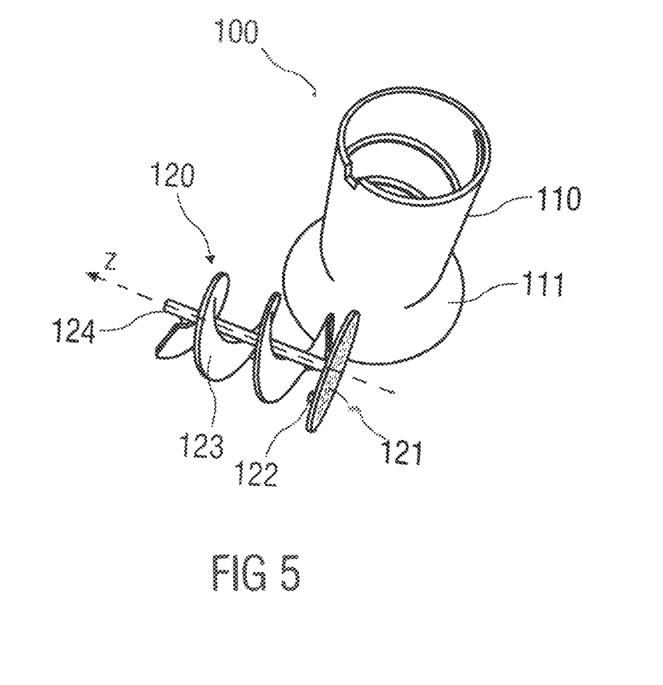
FIG. 5, schematically, is a perspective view of a disassembled axial separator with standpipe and screw.

FIG. 5 shows the axial separator 100 in the disassembled state, that is to say with the coil 120 removed. On the inlet-side end of the standpipe 110, a stopping groove 113 is recessed in the axial direction, which is formed correspondingly to a stopping catch 122 protruding in a radial direction y from the sieve plate 121.

The removed screw 120 comprises a screw coil 123 with a screw axis 124 extending in the longitudinal direction of the screw 120, i.e., in the axial direction z. Presently, the screw coil 123 has about 2.5 complete windings. Yet it is also possible that the screw coil 123 has a different number of windings. Preferably, the screw coil 123 has approximately three windings with an axial extension of from about 100 to 120 mm.

The screw axis 124 is fixedly connected to the sieve plate 121 arranged perpendicularly on it on the inlet-side end. In the assembled state, the stopping catch 122 of the sieve plate 121 latches in the stopping groove 113 of the standpipe 110. Thus, the screw 120 and the standpipe 110 are fixed to the particle emission 112 in the assembled state in a non-rotational manner in opposition to each other.

On the outlet-side end, the screw axis 124 protrudes axially beyond the screw 120.

Figure 6:
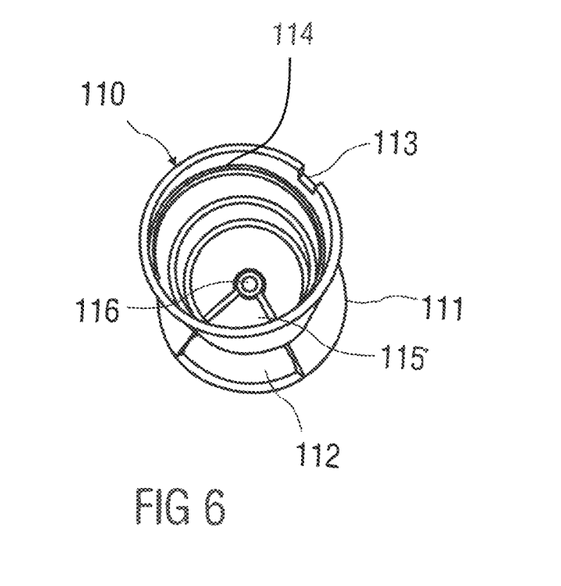
FIG. 6, schematically, is a perspective detailed view of a standpipe.

FIG. 6 shows the standpipe 110 in a view from the inlet-side end, i.e., from the end opposite the outlet trumpet 111. A screw-shaped stroke 114 is arranged on the inner wall of the standpipe 110. The screw-shaped stroke 114 protrudes from the inner wall of the standpipe 110 directed radially inwardly. The revolution of the stroke 114 is formed in the same way as the revolution of the screw coil 123 of the screw 120 in terms of direction and inclination. In the stopped installation position, i.e., with the stopping catch 122 of the sieve plate 121 latched in the stopping groove 113, the screw coil 123 and the stroke 114 are directly opposite each other in the radial direction y.

On the outlet-side end of the outlet trumpet 111, a circular-segment shaped lug 115 is arranged, which protrudes radially inwardly up to the centre of the standpipe 110 and tapers. A screw bearing 116 is arranged on the tapering inner end of the lug 115, the screw bearing having a bore for receiving the end of the screw axis 124 protruding on the outlet side.

The outer arc of the circular-segmented lug 115 is connected to the outlet-side end of the coating of the outlet trumpet 111 and extends on the coating of the outlet trumpet 111 approximately over the same angular region (or peripheral part) as the particle emission 112. In other words, the particle emission 112 and the lug 115 are arranged to be flush in the axial direction z. The outlet trumpet 111 is thus covered in the region of the lug 115, i.e., on the outlet side of the particle emission 112.

Together with the stopping groove 113, the screw bearing 116 arranged on the lug 115 causes the non-rotational reception of the screw 120 on both sides in the standpipe 110. Furthermore, since it offers resistance to the axial current, the lug 115 causes a current pressure of the outflowing battery gas that is locally increased in the region between the lug 115 and the particle emission 112.

Figure 7:
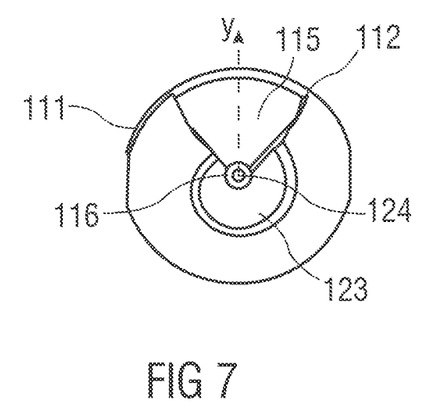
FIG. 7, schematically, is an outlet-side view of an axial separator.

FIG. 7 shows an outlet-side top view of the standpipe 110 with set outlet trumpet 111 and inserted screw 120.

The functionality of the axial separator 100 is explained below. In the event of a thermal overload, battery modules 3 can burst and, here, release battery gas and hot particles, for example graphite or metal particles, which can form a mixture capable of igniting. The proposed axial separator 100 separates the particles from the outflowing battery gas and thus reduces the probability of the mixture igniting.

Larger particles of the particle-battery gas mixture are held back by the sieve plate 121 from entering the axial separator 100 and thus remain inside the battery housing 2. The hole size of the sieve plate 121 is preferably chosen in such a way that particles with a diameter of 1.5 mm or larger are held back.

Battery gas and particles whose diameter is smaller than the hole size of the sieve plate 121 enter the axial separator 100 and are led through the axial separator 100 in the axial direction z by the screw coil 123 and the correspondingly formed stroke 114 opposite the edge of the standpipe 110 on a screw-shaped track.

The screw-shaped guide of the particle-battery gas mixture also causes turbulences on the inlet side of the sieve plate 121. Thus, separated large particles are guided away from the sieve plate 121 or are blown away and congestion of the sieve plate 121 is avoided.

The sieve plate 121 can additionally be formed to be convexly curved, which supports the leading away or blowing away of the large particles separated thereon.

Furthermore, the strained, screw-shaped current of the particle-battery gas mixture causes its de-mixing, wherein the heavier particles are moved radially outwardly, i.e., towards the inner wall of the standpipe 110, under the influence of centrifugal force, and here the lighter battery gas is moved radially inwardly, i.e., pushed onto the screw axis 124. This radial de-mixing increases in the axial direction z and, in the outlet trumpet 111, achieves the greatest separation between particles, which flow on the inner wall of the outlet trumpet 111, and the battery gas, which is pushed inside the outlet trumpet 111.

The centrifugal force acting in the radial direction y simultaneously causes the radial emergence of the particles through the slot-shaped particle emission 112, as is schematically depicted in FIG. 7. The emergence of the particles is supported by the current pressure increased by means of the stroke 114 on the particle emission 112.

The emerging particles are pressed through the particle channel 9 into the lower-current region of the separating chamber 10 and are collected there. The battery gas mixture cleared in this way and only still containing very small and light particles with diameters typically of between 10 micrometres and 100 micrometres is released via the outlet trumpet 111, passes the downstream bursting disc 6 and/or the downstream bursting valve 7 and is emitted into the surroundings of the battery housing 2. Since the glowing time of the particles decreases with their size, the very small and light particles still contained are vaporised when they emerge into the surroundings and can no longer ignite the battery gas.

It has transpired that the period of time between a thermal overload of a battery module 3, triggered, for example, by forcing a metal nail into a battery pack 1, and a battery fire can be increased when the battery gas is guided out of the battery housing 2 via the axial separator 100 according to the invention. Thus, for example in pre-tests without the particle separator according to the invention, an ignition of the battery gas by particles within less than five minutes has been established. In tests with the particle separator according to the invention, an ignition of the battery gas by particles has, in contrast, never been established. Instead, the ignition of the battery gas always took place more than five minutes later by other ignition source, such as, for example, high voltage flashovers. Thus, in order to warn a user, for example a vehicle occupant of an electric vehicle that is supplied with such battery packs 1, an increased time duration is available, which corresponds to the legal requirements and norms. An advantage of the invention is thus the improved application safety and the extended usage region of battery packs 1, which are provided with the proposed axial separator 100.

Conventional particle-battery gas separators separate the particle-battery gas mixture by acceleration, wherein, due to their greater inertia, the heavier particles are deflected less quickly than the lighter battery gas. Here, the particles sink to the ground anywhere along the acceleration path. An advantage of the invention is, in contrast, that the particles are collected and eventually stored in an encapsulated region, the separation chamber 10, which can be easily secured against the emergence or propagation of a fire.

In order to test the efficacy of the axial separator 100, computer simulations have been carried out. For this, the software StarCCM+ has been used and 3D Euler-Lagrange gas particle simulations have been carried out.

The following basic conditions have been assumed in the computer simulation: stationary simulation, gas mass flow rate 25 g/s, gas inlet temperature 300° C. (worst case scenario), wall temperature adiabatic, particle starting temperature 1000° C., particle material graphite and NMC (lithium-nickel-manganese-cobalt-oxide) and copper, particle shape spherical.

The following results were obtained in the computer simulation: pressure drop in the axial separator 100 of 340 mbar, maximum Mach number 0.54, separation rate for particles with a diameter of from 50 to 1000 μm 100%.

Figure 8:
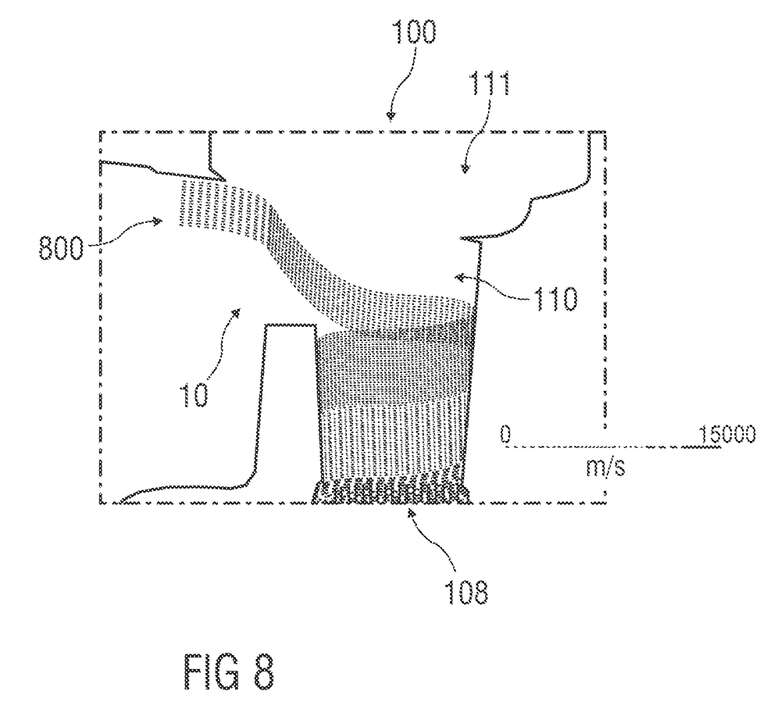
FIG. 8 shows the result of a computer simulation with eight hundred particles, wherein the axial separator is standing "on its head".

FIG. 8 schematically illustrates the result of such a computer simulation with eight hundred particles. In the depiction, the axial separator 100 is shown in section. The axial separator 100 is here standing "on its head", i.e., the outlet trumpet 111 is arranged above, the standpipe 110 is below it and the inlet 8 below that. The separating chamber 10 is to the left of this. The path of the particles is depicted in the shape of a plurality of lines (trajectories 800), which schematically illustrate the eight hundred total trajectories simulated in the Euler-Lagrange gas-particle simulations. It can be seen from the depiction as to how the particles emerge into the axial separator 100 "from below" with relatively low speed of under 3,000 n/s, are then accelerated "upwards" to above 12,000 m/s when flowing through the gas channel wound in a screw shape in the z-direction and finally emerge out of the axial separator 100 and into the separation chamber 10 in the y-direction, where they are abruptly decelerated and finally come to a standstill, i.e., are stored. As already mentioned above, the separation rate for particles with a diameter of from 50 to 1000 μm is 100%.

In terms of the installation position of the axial separator 100 in the motor vehicle, it should be noted that this can be random, i.e., the axial separator can, in principle, assume any spatial orientation in the motor vehicle. However, here the limitation applies that, in the installation position, it must be ensured that the particles stored in the separation chamber 10 do not fall back through the slot-shaped particle emission 112 into the axial separator. The thus virtually random installation position means an improvement of the design freedom in the sense of a flexible use of the small construction space available in the motor vehicle.

LIST OF REFERENCE CHARACTERS

1 Battery pack
2 Battery housing
3 Battery module
4 Insulating insert
5 Aperture
6 Bursting disc
7 Bursting valve
8 Inlet
9 Particle channel
10 Separating chamber
100 Axial separator, particle separator
110 Standpipe
111 Outlet trumpet, outlet
112 Particle emission
113 Stopping groove
114 Stroke
115 Lug
116 Coil bearing
120 Coil
121 Sieve plate
122 Stopping catch
123 Coil winding
124 Coil axis
z axial direction
y radial direction

The invention claimed is:

1. A particle separator of a battery housing, comprising:
   an inlet;
   an outlet;
   wherein solid particle are separable from a particle-battery gas mixture introduced with overpressure at the inlet by the particle separator and wherein the battery gas is depressurizable at the outlet; and
   a gas channel wound in a screw shape in an axial direction which fluidically connects the inlet to the outlet, wherein the gas channel has a particle emission on an outlet-side end of the particle separator which is opened in a radial direction and through which the solid particles are passable.

2. The particle separator according to claim 1:
   wherein the gas channel is formed by a coil disposed in a standpipe;
   wherein the coil has a coil winding wound around an axial coil axis;
   wherein the standpipe has a stroke protruding radially inwardly and wound correspondingly to the coil winding;
   wherein the standpipe is sealed in a gas-permeable manner on an inlet side with a sieve plate and is widened in a shape of a trumpet on an outlet side in an outlet trumpet; and
   wherein the particle emission is a radial slot in a coating of the standpipe in a region of the outlet trumpet.

3. The particle separator according to claim 2, wherein the coil winding and the stroke each have three windings.

4. The particle separator according to claim 2, wherein the particle emission extends beyond a full winding height of the coil winding and is radially opened.

5. The particle separator according to claim 2, wherein solid particles with a diameter of 1.5 millimeters or larger are holdable back by the sieve plate.

6. The particle separator according to claim 2, wherein the sieve plate is convexly curved.

7. A battery housing in which a battery module is encapsulatable in a gas-tight manner, comprising:
- an insulating insert having an aperture disposed therein, wherein an interior of the battery housing is fluidically connectable to a surrounding of the battery housing above a predetermined overpressure threshold value in the interior by the aperture;
- the particle separator according to claim 1, wherein the particle separator is disposed in the aperture; and
- a separating chamber recessed in the insulating insert which is fluidically connected to the particle emission of the particle separator.

8. A battery pack, comprising:
- the battery housing according to claim 7; and
- a battery module encapsulated in the battery housing.

9. The battery pack according to claim 8, wherein the battery module comprises at least one lithium-ion battery cell.

* * * * *